UNITED STATES PATENT OFFICE.

CARL JAGERSPACHER, OF BASEL, SWITZERLAND, ASSIGNOR TO SOCIETY OF CHEMICAL INDUSTRY IN BASLE, OF BASEL, SWITZERLAND.

AZO DYESTUFFS DYEING ON MORDANTS.

1,375,701.  Specification of Letters Patent.  Patented Apr. 26, 1921.

No Drawing.  Application filed November 15, 1919. Serial No. 338,346.

*To all whom it may concern:*

Be it known that I, CARL JAGERSPACHER, a citizen of the Swiss Republic, and resident of Basel, Switzerland, have invented new and useful Azo Dyestuffs Dyeing on Mordants, of which the following is a full, clear, and exact specification.

This is a continuation in part of my application for Letters Patent filed May 14, 1919, Ser. No. 297095.

I have found that by combining aromatic orthooxy-diazocompounds with 1:8-dioxynaphthalenesulfocarboxylic acids, there are obtained new azodyestuffs dyeing on mordants which are particularly suitable for printing cotton with chromium mordants. These new azodyestuffs constitute, in a dry state, dark powders, which dissolve in water with red violet to blue colorations and in concentrated sulfuric acid with violet to green-blue colorations, dye wool in an acid bath violet tints becoming, on subsequent chroming, fast blue to black, and produce fast blue to black prints, when printed on cotton with chromium mordants.

The manufacture of the new 1:8-dioxynaphthalenesulfocarboxylic acids employed as parent materials and the manufacture of the new azodyestuffs derived from the said acids are illustrated by the following examples:

Example 1.

*Preparation of the 1:8-dioxynaphthalene-3-sulfo-6-carboxylic acid.*—376 parts of naphthalene-5:7-disulfo-2-carboxylic acid (derived from the corresponding naphthylamino-disulfonic acid by substituting a cyanogen group for the amino group and subsequently saponifying the cyanogen group) are finely ground and dissolved without cooling, in 1500 parts of sulfuric acid of 65° Bé. whereby the temperature rises to 35 to 40° C. After cooling the solution down to 25° C., there are added 100 parts of nitric acid of 40° Bé., while stirring and cooling with water. The temperature rises up to 45° C. The clear, yellow nitrated mass is introduced into 4000 parts of water and reduced by adding gradually 23 parts of iron filings at 25 to 45° C. The iron-sodium salt of the 1-aminonaphthalene-6:8-disulfo-3-carboxylic acid, which precipitates hereby, is separated by filtration, after the mass is cooled down, and converted in known manner into the corresponding calcium-sodium salt and this latter is converted afterward into the corresponding disodium salt. A separation of the acid for the subsequent diazotation is not necessary.

250 parts of this disulfonated aminonaphtoic acid in form of neutral solution of 12 per cent., are acidified with 125 parts of concentrated sulfuric acid and diazotized, at a temperature not over 12° C., with 50 parts of sodium nitrite. The diazocompound, which is partly separated, is decomposed by boiling. When no diazocompound can further be detected, the mass is neutralized with milk of lime, filtered and the sodium salt is prepared with sodium carbonate. From the solution separated from the calcium carbonate formed by filtration, the 1:8-naphthosulton-6-sulfo-3-carboxylic acid does not have to be separated, but on the contrary it can be employed directly for the subsequent melting process, after it has been concentrated to the necessary degree of concentration. To effect concentration the solution is evaporated to 600 parts by weight and 300 parts of solid soda lye are added thereto and the resulting mixture is heated in an autoclave for 3½ hours at 185 to 190° C., while stirring. The melted mass is acidified with hydrochloric acid and the sulfurous acid expelled by boiling. From the nearly saturated salt solution the 1:8-dioxynaphthalene-3-sulfo-6-carboxylic acid crystallizes in form of yellow brown crystals. By redissolving in water and precipitating with common salt the new acid is obtained, in a pure state, in the form of sandy, yellow precipitate. It constitutes a yellow powder, and is readily soluble in hot water. Its alkaline solution shows a green fluorescene. With diazocompounds which combine difficultly, it combines more easily than the chromotropic acid (1:8-dioxynaphthalene-3:6-disulfonic acid).

If instead of the naphthalene-5:7-disulfo-2-carboxylic acid, the naphthalene-1:8-disulfo-2-carboxylic acid (obtainable from the corresponding naphthylamindisulfonic acid) be employed as parent material, there is obtained in an analogous manner the 1:8-dioxynaphthalene-4-sulfo-6-carboxylic acid. This acid constitutes in a dry state a yellow-brown powder and is more easily soluble in water than the isomeric 1:8-dioxynaphthalene-3-sulfo-6-carboxylic acid. Its alkaline solution shows a feeble blue-green fluorescence.

Example 2.

18.7 parts of 2-amino-4-chloro-1-oxybenzene-6-carboxylic acid are diazotized in known manner as concentrated as possible, and the resulting diazo compound is introduced while stirring, into a mixture of 28.4 parts of 1:8-dioxynaphthalene-6-sulfo-3-carboxylic acid and 100 parts of milk of lime of 20 per cent. The combination being effected, the dyestuff is separated by adding hydrochloric acid, filtered off, dissolved in sodium carbonate, separated by filtration from the calcium carbonate formed, salted out from the filtrate, separated by filtration and dried. The combination can also be carried out in an acetic solution.

The dyestuff constitutes in a dry state, a blue-black powder, dissolving in water to red-violet solutions and in concentrated sulfuric acid with green-blue coloration. When printed on cotton with chromium mordants, it gives blue prints fast to soaping, chlorin and light.

If instead of the 1:8-dioxynaphthalene-3-sulfo-6-carboxylic acid the isomeric 1:8-dioxynaphthalene-4-sulfo-6-carboxylic acid is employed there results a similar somewhat redder dyestuff.

Example 3.

The diazo-compound derived from 16 parts of 2-amino-6-nitro-4-methyl-1-oxybenzene and prepared as concentrated as possible is united with a suspension of 28.4 parts of 1:8-dioxynaphthalene-6-sulfo-3-carboxylic acid in 100 parts of milk of lime of 20 per cent. The combination being effected, the reaction mass is acidified with hydrochloric acid, the separated dyestuff is dissolved with sodium carbonate, the solution of the dyestuff separated from the calcium carbonate formed by filtration, the dyestuff salted out from the filtrate, separated by filtration and dried.

The dyestuff constitutes, in a dry state, a blue-black powder, dissolving in water to violet solutions and in concentrated sulfuric acid to blue solutions. It dyes wool, in an acid bath, violet tints turning, on subsequent chroming, to a blue fast to fulling, potting and light; when printed on cotton with chromium mordants, it gives blue prints fast to soaping, chlorin and light.

If instead of the 1:8 dioxynaphthalene-3-sulfo-6-carboxylic acid the isomeric 1:8-dioxynaphthalene-4-sulfo-6-carboxylic acid is employed there is obtained a similar, somewhat redder dyestuff.

Example 4.

The diazo-compound derived from 19.7 parts of 2-amino-3:6-dinitro-1-oxybenzene and prepared as concentrated as possible is united with a suspension of 28.4 parts of 1:8-dioxynaphthalene-6-sulfo-3-carboxylic acid in 100 parts of milk of lime of 20 per cent. The combination being effected, the reaction mass is acidified with hydrochloric acid, the separated dyestuff is dissolved with sodium carbonate, the solution of the dyestuff separated from the calcium carbonate formed by filtration, the dyestuff salted out from the filtrate, separated by filtration and dried.

The dyestuff constitutes, in a dry state, a dark brown powder, dissolving in water to violet solutions and in concentrated sulfuric acid to violet solutions. It dyes wool, in an acid bath, blue-black tints turning, on subsequent chroming, to an olive green fast to fulling, potting and light. When printed on cotton with chromium mordants, it gives black prints fast to soaping, chlorin and light.

What I claim is:

1. As new products, the herein described azodyestuffs dyeing on mordants, derived from aromatic orthooxy-diazo-compounds and 1:8-dioxynaphthalene-sulfocarboxylic acids, which constitute, in a dry state, black to dark brown powders dissolving in water with violet colorations and in concentrated sulfuric acid with violet to green-blue colorations, dye wool in an acid bath red brown to blue-violet tints becoming on subsequent chroming, fast blue and olive to black and produce, when printed on cotton with chromium mordants, fast blue to black tints.

2. As a new article of manufacture the herein described azodyestuff dyeing on mordants, derived from 2-diazo-6-nitro-4-methyl-1-oxybenzene and 1:8-dioxynaphthalene-3-sulfo-6-carboxylic acid, which constitutes, in a dry state, a blue-black powder, dissolving in water to a violet and in concentrated sulfuric acid to a blue solution, dyes wool in an acid bath, violet tints turning, on subsequent chroming, to a blue fast to fulling and to potting and gives, when printed on cotton with chromium mordants, blue tints fast to soaping, chlorin and light.

In witness whereof I have hereunto signed my name this 28th day of October 1919, in the presence of two subscribing witnesses.

CARL JAGERSPACHER.

Witnesses:
H. H. DICK,
AMAND RITTER.